UNITED STATES PATENT OFFICE.

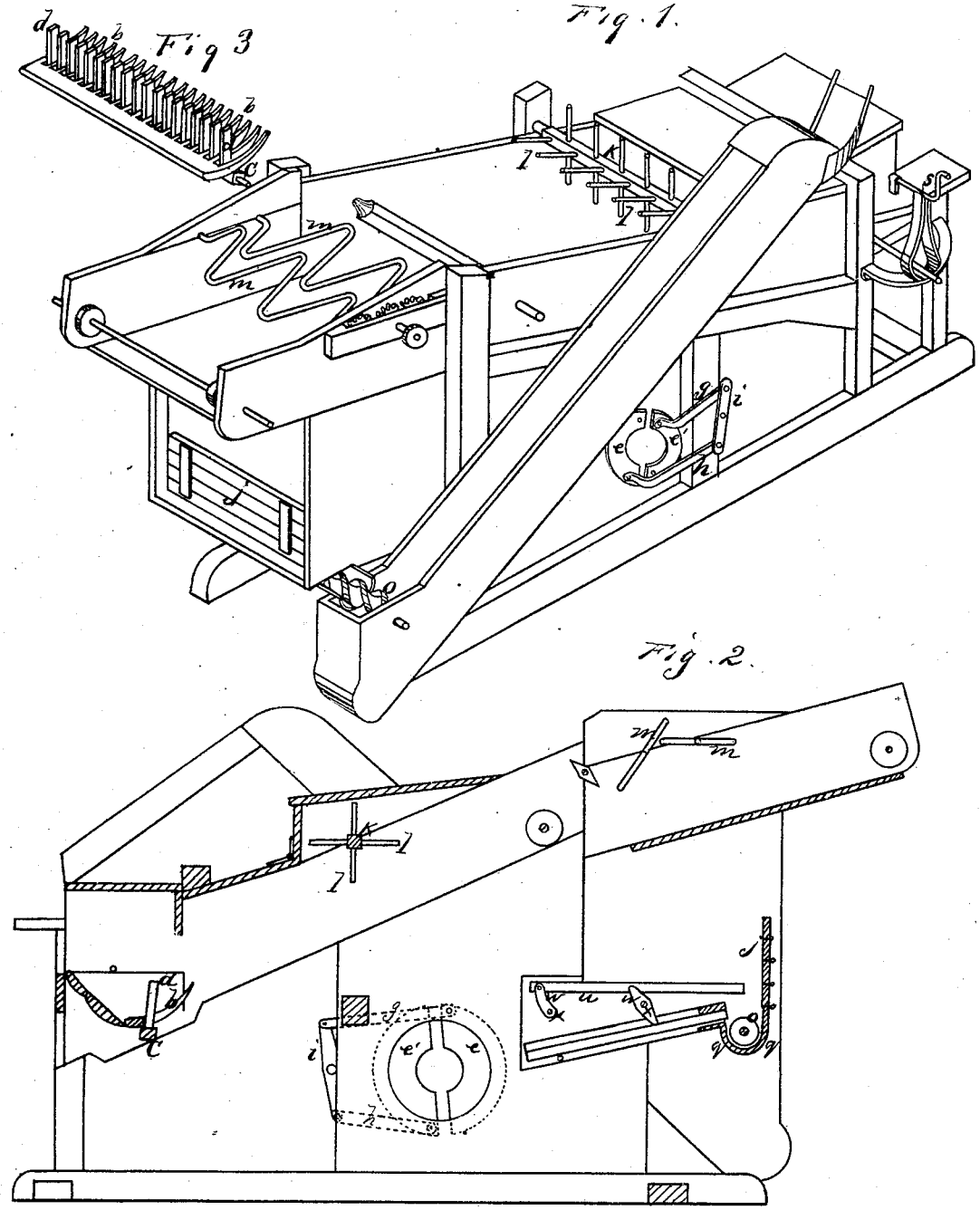

JAMES T. WATKINS, OF SANTA CLARA, CALIFORNIA.

IMPROVEMENT IN THRASHING-MACHINES.

Specification forming part of Letters Patent No. 134,114, dated December 17, 1872.

*To all whom it may concern:*

Be it known that I, JAMES T. WATKINS, of Santa Clara, Santa Clara county, State of California, have invented Improvements in Thrashing-Machines; and I do hereby declare the following description and accompanying drawing are sufficient to enable any person skilled in the art or science to which it most nearly appertains to make and use my said invention or improvement without further invention or experiment.

My invention relates to several improvements in the practical operation of thrashing-machines, by which many advantages are secured and the machine rendered less troublesome.

In order to properly describe these improvements reference is had to the accompanying drawing forming a part of this specification, in which—

Figure 1 is a perspective view of my machine; Fig. 2 is a side sectional elevation; and Fig. 3, a perspective view of comb and teeth detached from machine.

My first improvement consists in the employment of a series of parallel slats, $b\ b\ b$, in the form of a comb in the rear of the thrashing-concave, which receives the straw from the cylinder and passes it to the apron, while the grain is allowed to pass through between the teeth or slats, and fall upon the grain-belt below. A shaft, C, passes across the thrasher-frame just below this comb and carries a number of long teeth, $d\ d\ d$, which alternate with the teeth of the comb. The shaft is provided with a crank outside of the frame by which it can be turned so as to bring the teeth to a vertical position between the teeth of the comb, in which position they serve as a supplementary row of concave teeth to be brought into action whenever required. A third improvement which I have added to the machine is in an arrangement for regulating the blast of the fan by enlarging or diminishing the capacity of the side openings through which the fan is fed. To do this I employ two semicircular plates, $e\ e'$, of the desired width. One of these plates, $e'$, I attach by a pivot at its lower end to the frame below the ordinary opening; the other one, $e$, I attach in the same manner above and upon the opposite side of the opening, so that by moving their opposite free ends toward each other or apart the opening can be made larger or smaller, as desired. A shaft passes across the frame just back of the openings, to each end of which a lever, $i$, is secured at its middle. Rods $g\ h$ connect the ends of the levers with the free ends of the plates $e\ e'$ upon each side of the machine, so that by moving this lever about its center the openings upon both sides are regulated simultaneously. The tail-board $j$ I construct of several strips or boards which are united together by straps or hinges, as shown, so that it can be raised or lowered to any height desired by turning up or down one or more of the strips or boards.

Above the straw-carrier $i$, instead of beaters, I employ one or more series of long teeth or fingers, $l\ l$, which, instead of beating the straw, gently pick it up and loosen it with a shaking motion, so as to allow the grains to be released and pass through the carrier. Over the upper straw-carrier I employ peculiar-shaped agitators $m\ m$. These agitators each consist of a metal rod, which is bent in a zigzag manner back and forth, so that each two adjoining ones alternate. These agitators bear in the opposite sides of the frame and are revolved by gearing upon the outside. Their action is to give the passing straw an undulatory motion somewhat like a kneading process. This class of agitators I have found to be superior to any other kind, for the reason that they do not beat the straw, and cause the grains to jump up by the reaction of the straw, but simply agitate it sufficiently to free the wheat. The shoe I drive directly from the screw-conveyer or by a crank-connection, so that the two work in unison with each other. The screen $u$ of the shoe is connected at each corner with the transverse shafts V by a link, W, which supports it, and gives it the desired shaking and jarring motion. I extend the screw-conveyer $o$, which carries the grain from the separator-shoe to the elevator $p$, entirely across the lower end of the elevator. By extending it entirely across the elevator, choking and clogging are avoided, and the grain kept in motion so as to be distributed to the buckets of the elevator. I also arrange a crank-shaft, S, at the forward end of the separator, which is properly mounted to permit of the belt which drives the separator being wound upon it in the manner of a reel when it is desired to move the machine.

By these additions and improvements I avoid a large portion of the trouble usually attending the running of thrashing-machines.

Having thus described my improvements, what I claim, and desire to secure by Letters Patent, is—

1. The horizontal comb consisting of the parallel slats $b\ b$, substantially as and for the purpose above described.

2. The shaft C with its teeth $d\ d$ so arranged as to provide a supplementary row of concave teeth when desired, as specified.

3. The two oppositely-moving semicircular plates $e\ e'$, pivoted, alternately, above and below the blast-opening, in combination with shaft $f$, centrally-pivoted lever $i$, and connecting-rods $g$ and $h$, substantially as and for the purpose above described.

4. The tail-board $j$, consisting of parallel sections hinged or strapped together, for the purpose specified.

5. The agitators $m\ m$, constructed as described, and arranged to operate as and for the purpose specified.

6. The screen $u$, operated by the links W from the shafts $x$, said shafts being driven by a crank-connection with the conveyer.

In witness whereof I have hereunto set my hand and seal.

JAMES T. WATKINS. [L. S.]

Witnesses:
   J. L. BOONE,
   C. M. RICHARDSON.